United States Patent
Goldstaub

[11] 3,898,766
[45] Aug. 12, 1975

[54] COMBINATION PLANTING DEVICE

[76] Inventor: Jacques B. Goldstaub, 547 Merritt Ave., Oakland, Calif. 94610

[22] Filed: Jan. 21, 1974

[21] Appl. No.: 434,878

[52] U.S. Cl. .................................. 47/38.1; 47/1.2
[51] Int. Cl.² ......................................... A01G 27/00
[58] Field of Search ............. 47/38, 38.1, 38.10, 1.2

[56] References Cited
UNITED STATES PATENTS

| | | | |
|---|---|---|---|
| 918,563 | 4/1909 | Lewis | 47/38.1 |
| 1,117,474 | 11/1914 | Benning | 47/38.1 |
| 1,989,403 | 1/1935 | Dauernheim | 47/38.1 X |
| 2,072,165 | 3/1937 | Fow | 47/38 X |
| 2,172,514 | 9/1939 | Lockyer | 47/38.1 |
| 2,346,029 | 4/1944 | Jennings | 47/38.1 |
| 3,018,586 | 1/1962 | Farley | 47/38.1 X |
| 3,137,096 | 6/1964 | Hopkins | 47/38 |
| 3,199,250 | 8/1965 | Sawyer | 47/38.1 X |
| 3,298,133 | 1/1967 | Courtright | 47/38.1 X |
| 3,576,088 | 4/1971 | Arca | 47/38.1 |

FOREIGN PATENTS OR APPLICATIONS

| | | | |
|---|---|---|---|
| 289,885 | 10/1965 | Australia | 47/38.1 |
| 1,098,155 | 1/1968 | United Kingdom | 47/38.1 |

Primary Examiner—E. H. Eickholt
Attorney, Agent, or Firm—Flehr, Hohbach, Test, Albritton & Herbert

[57] ABSTRACT

A combination planting device having an apertured upper grid to supportingly receive a plurality of individual plants and their containers. The grid is supported on a frame within an outer container which holds a reservoir of water and nutritive elements in a bottom region, and is spaced inwardly from the outer container to insure adequate passage of air. The grid permits each plant container to be removably and individually positioned for decorative effect or proper lighting or to meet other requirements. Each individual plant container is provided with a fibrous liner or wick that functions to retain soil in the container and to transmit nutrient liquid from the reservoir by capillary action. The outer container may be a mere cache pot, or it may be a decorative structure (movable or fixed).

11 Claims, 6 Drawing Figures

3,898,766

PATENTED AUG 12 1975

SHEET 1

COMBINATION PLANTING DEVICE

BACKGROUND OF THE INVENTION

The present invention is directed to combination planting devices and more specifically to a planting device which enables a plurality of differently sized or configured plant containers to be interchangeably positioned within a substantially self-sufficient environment.

In the planting and maintenance of potted plants, it is necessary to make adequate provision for watering the plants and maintaining the soil in moist condition. Since the average household plant must be watered every one to three days, conventional planting arrangements require constant attention. This is particularly the case with simple plant containers having a hole in the bottom to permit drainage of excess water. A further problem is the proper placement of the plants so that they receive adequate sunlight and ventilation. In the case of large planters or groups of plants, serious difficulties can be presented. In addition, conventional planting arrangements provide little potential for variation in the decorative arrangement, or for movement or replacement of individual plants.

While efforts have been made to develop planting devices which provide a reservoir for maintaining plant moisture for an extended period of time, such prior planters have generally proved unsatisfactory. A major difficulty has been that the soil becomes overly saturated with water, causing degeneration or rot. A further problem is the provision of planting devices that are easily watered, or provided with the nutrient supplements, within a household environment. Thus, decorative use of the planting devices on hardwood floors, upon furniture of elsewhere within a residential environment, are difficult if not impossible to achieve with any degree of permanence of the arrangement. As a consequence, many persons who would otherwise enjoy the presence of interior or household plants, become discouraged, and discontinue their use.

OBJECTS AND SUMMARY OF THE INVENTION

In general, it is an object of the present invention to improve the construction of planting devices of the type described, and particularly to provide a combination planting device which insures a high degree of flexibility in the placement and maintenance of household or garden variety plants.

It is another object to provide a combination planting device of the above type which will overcome the necessity of too frequent watering cycles, while providing adequate ventilation and adjustability with respect to light and other requirements.

It is another object of the invention to provide a combination planting device of such character which facilitates the simple, effective placement of a plurality of plants of differing sizes, in a decorative, attractive self-maintaining environment.

A particular object of the present invention is to provide a combination planting device capable of achieving the foregoing features, which is extremely simple and inexpensive in construction, and highly adaptable and decorative in use.

Other objects and advantages will appear from the detailed description and from the drawing.

Generally stated, a combination planting device of the present invention comprises an outer liquid retaining container within which there is positioned an upstanding support frame on the top of which is carried an apertured plant receiving grid. The grid is provided with one or more openings having a cross-section corresponding to the cross-section of individual plant containers and their retained plants and soil. The frame and grid are spaced from the outer container to provide peripheral air passages and to hold the individual plant containers at a spaced position above the bottom of the outer container. Water and nutrient elements are introduced through this peripheral passage to form a reservoir in a lower region of the outer container. The individual plant containers are provided with liner or wick means in a bottom portion which extend downward into the reservoir space, and which function to transmit life-supporting moisture to the soil and plant by capillary action.

The described arrangement is particularly useful in that it permits use of removable grids and, thereby, the positioning of one or several planting pots in a truly interchangeable manner. Once a particularly decorative arrangement has been chosen, the wick means insure a self-watering effect over long periods of time, with easy passage of air and replenishment of water and nutrient elements through the peripheral passage. The invention also contemplates the provision of additional means for introducing liquid to the reservoir and for determining the liquid level, and for positioning and supporting individual plants and decorative elements.

DETAILED DESCRIPTION OF THE DRAWINGS

Figure 1:
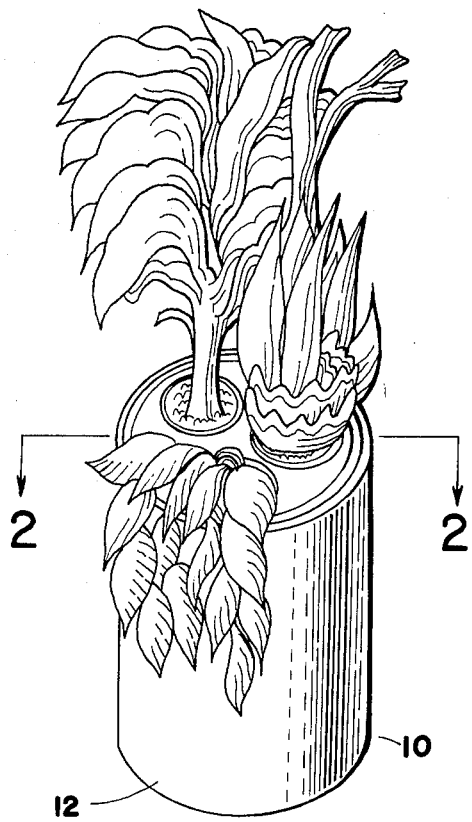
FIG. 1 is a perspective view of a combination planting device in accordance with the present invention, illustrating the feature of positioning a plurality of individual plants in a decorative arrangement.
Figure 3:
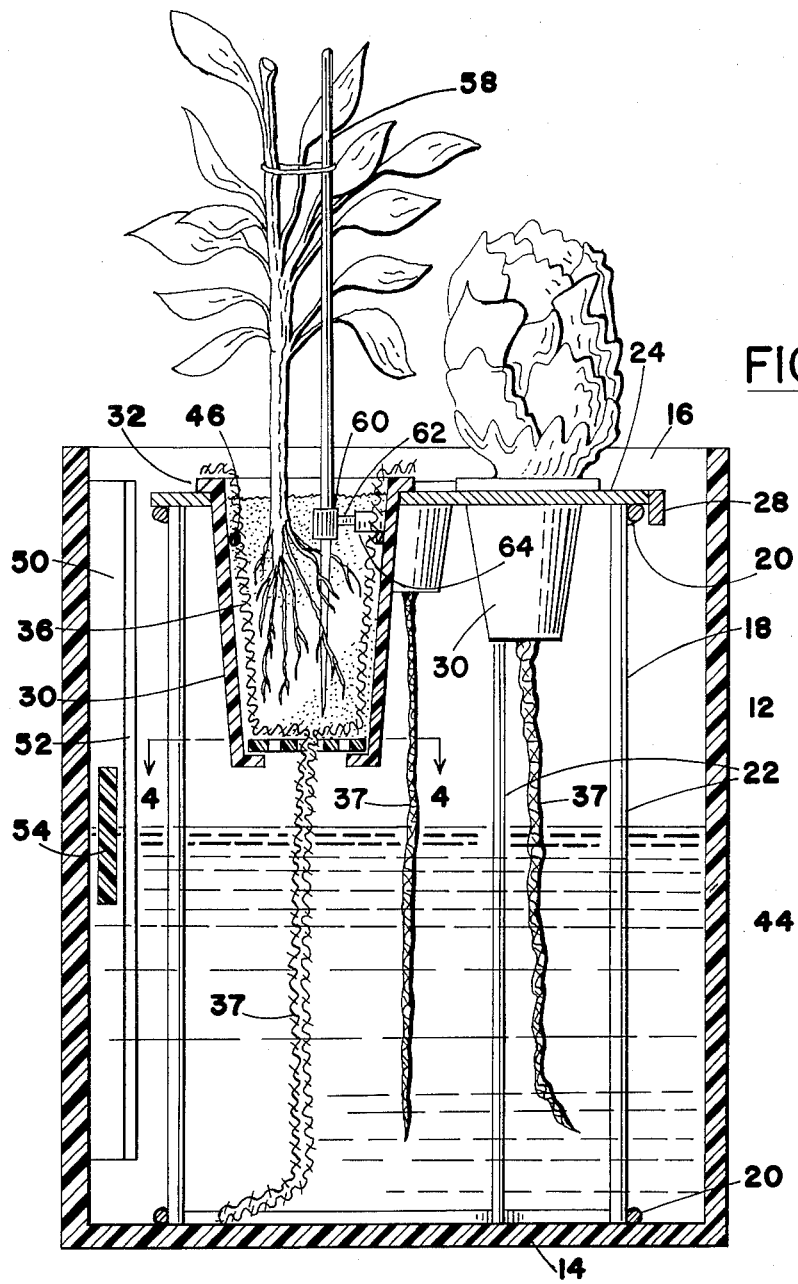
FIG. 3 is a view in vertical section along the line 3—3 of FIG. 2, illustrating particular details of the invention.

Referring now specifically to FIGS. 1 and 3, a combination planting device 10 is provided which includes a generally cylindrical outer container 12 provided with a closed bottom 14 and an open top 16. The outer container or receptacle 12 may be constructed of any water-impervious material such as plastic (opaque, translucent or otherwise), metal, tile, ceramic, vitreous, or composition material. The general function of the outer container is to provide a decorative support for a plurality of individual planters while at the same time providing a reservoir for life-supporting water and nutrient elements.

Figure 5:
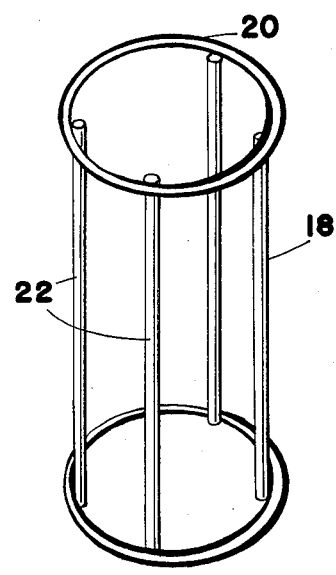
FIG. 5 is a perspective view on a reduced scale, illustrating a particular feature of the invention.

As shown in FIG. 3, an open upstanding interior support frame 18 is provided, bottom portions of which are supported on the bottom wall 14 of the outer container. As particularly illustrated in FIG. 5, the support frame 18 may be simply constructed as spaced loops 20 rigidly held in position by vertical members 22. The frame 18 may likewise be constructed of suitable materials, for example, welded metal, plastic, wood or like structural elements.

Figure 2:
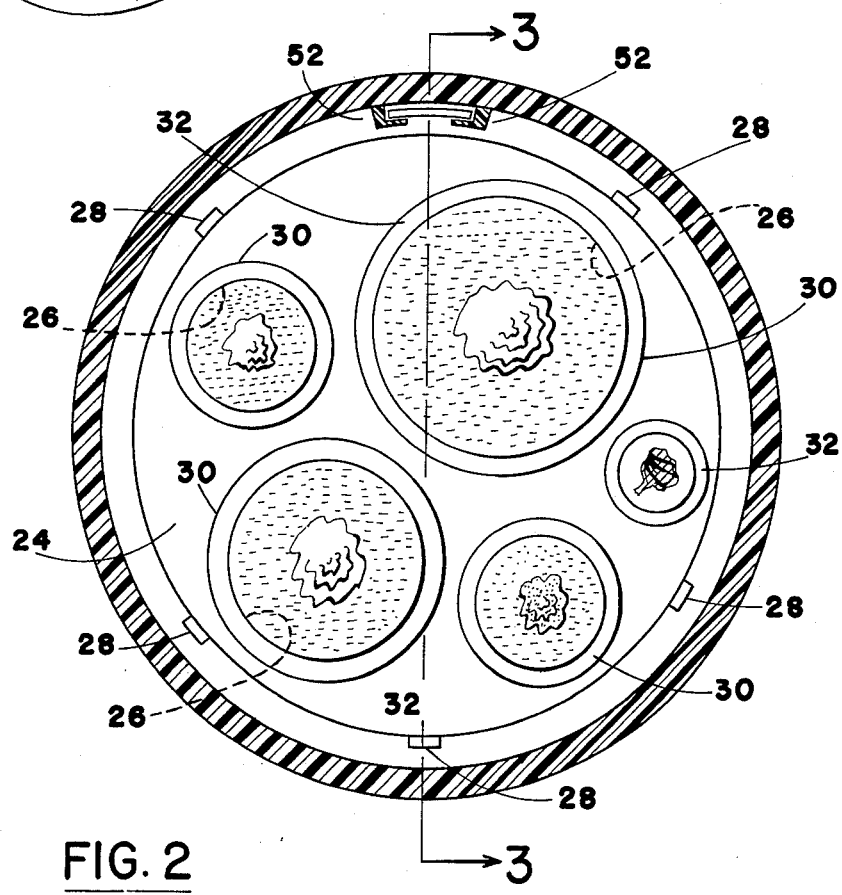
FIG. 2 is an enlarged cross-sectional view taken along the line 2—2 of FIG. 1, particularly illustrating the provision for multiple plantings.

As illustrated in FIGS. 2 and 3, the frame 18 provides a means to removably support an apertured grid or plant holder 24. The grid is of generally planar configuration, and is provided with a series of openings 26 of a configuration corresponding to that of interior plant containers, as generally represented at 30. It is a feature of the invention that a plurality of grids 24 with differing configurations or arrangements of the apertures 26, may be interchangeably positioned upon the upper surface of the frame 18. Each such can be freely positioned on the upper loop 20 of the frame, where it may be held in place by depending lugs 28 positioned about its periphery. The grid 24 may similarly be constructed of any appropriate material such as metal, plastic or the like, employing suitable fabrication technique for the material employed (e.g. dye-casting injection molding, etc.).

Although specifically illustrated as apertured plate members, the grids 24 may be advantageously constructed as an open frame wherein a plurality of open interconnected wires or like support members form the openings 26 for the plant containers 30. In like fashion, the apertures 26 may be oblong, square, triangular or of any other configuration adapted to the plant containers 30.

As best illustrated in FIGS. 2 and 3, the plant containers 30 can be conveniently supported within the grid apertures 26 by means of a rim or extending edge 32 of greater diameter than the opening 26. This arrangement permits the placement of self-contained planting units or pots 30, including soil, plant and necessary attachments. Thus, as illustratively suggested in FIG. 1, one of the planting units 30 might contain a large broad leaf plant, succulents or even decorative elements such as a tree trunk. Moreover, the provision for interchangeability of planting units within the apertures 26 of the grid 24, enables the homeowner, apartment manager, etc. to make a wide and varied selection as suited to particular conditions of lighting, season of the year, interior decoration, or other requirements.

Figure 4:
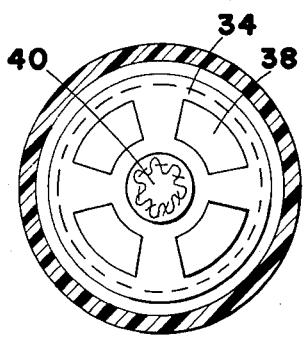
FIG. 4 is a cross-sectional view along the line 4—4 of FIG. 3.

In a preferred embodiment of the planting unit, as particularly shown in FIG. 3, the pot 30 includes an apertured removable bottom 34 which cooperates with an interior liner 36 to hold both the plant and soil in place within the pot. As shown in FIG. 4, the removable bottom 34 can be provided with spaced openings 38 for air or ventilation and a central opening 40. The provision of the central opening 40 enables a portion 37 of the liner 36 to extend downward into a lower region of the outer container. Thus, as previously noted, the space within the outer container between the planting units 30 can be employed as a reservoir for water and nutritive elements necessary to support plant life. Normally, the volume of this reservoir, represented at 44, will be sufficient to maintain the various plants supported upon the grid and within the outer container 12, for substantial periods of time.

It will be understood that the plant containers 30 may assume a wide variety of forms, including clay or ceramic pots, plastic sacs or bags, metal, wood or the like. In like fashion, the cross-sectional configuration of the planters may vary, as desired, or as obtained by random movement of the material of construction (e.g. thin walled plastic).

Referring again to FIG. 3, the liner 36 is suitably constructed of fibrous components capable of attracting and transmitting water and moisture by capillary action. Thus, in a typical installation, the liner 36 may comprise a conventional stocking, for example, as formed from cotton, wool or synthetic fibres capable of providing the desired capillary effect. Such stocking can be peripherally attached to the interior of the pot, adjacent the top, as at 46, and is twisted or otherwise densified in a lower region to form a downwardly extending capillary rope or wick 37. As will be understood by one skilled in this art, the portion 37 will function as a capillary wick to effect movement of the liquid from the reservoir 44 through the opening 40 for nutritive use by the soil and roots of the plant contained within the unit 30. In such operation, the frame 18 serves to hold the planting units 30 in spaced relation above the nutrient liquid and with respect to the wall of the outer container 12, thus insuring access to atmospheric air to provide the desired wicking effect. The frame 18 and support grid 24 also ensure proper spacing of the various planting units 30 so as to avoid any interference in the operation of several adjacent wick elements 37.

Figure 6:
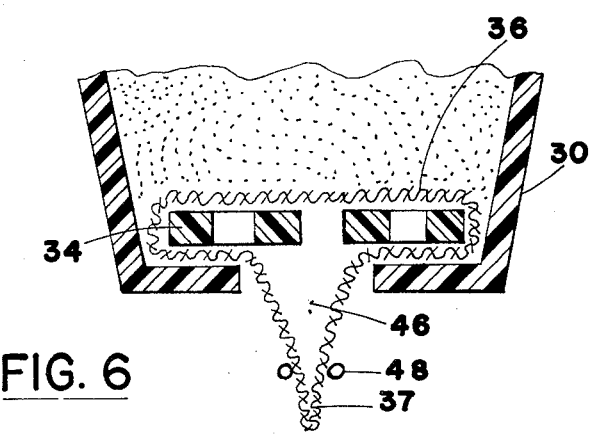
FIG. 6 is a fragmentary, detailed view, similar to FIG. 3, illustrating a modified form of the invention.

FIG. 6 illustrates a variation in the means to support the liner 36 so that the wick element 37 depends freely from the bottom of the plant container 30. In this arrangement, liner 36 surrounds and is supported by the removable bottom element 34, and extends freely through the bottom opening 46 of the plant container 30. If desired, the lower portions of the liner 36 may be twisted or held together by suitable means 48 (e.g. ties, elastic bands, etc.) to form the desired wicking element 37. It will be understood that in either of the embodiments illustrated, the liner 36 and removable bottom 34 provide a convenient means for removal of the plant and soil from within the inner containers or pots 30.

In the use of the planting device, it is desirable to provide means to add additional nutrient liquid to the reservoir 44, and to easily determine the liquid level of the reservoir without disturbing the planting arrangement within the support grid 24. As illustrated in FIGS. 2 and 3, this particular function can be accomplished through use of a filling spout 50, suitably formed of spaced-apart guide elements 52 attached to the interior wall of the container 12. By positioning an appropriate float element 54 within the guide elements, the liquid level of the reservoir 44 can be easily determined without interfering with filling operations through the filling spout 50.

In the case of relatively large planting containers 30, it will generally be necessary to provide for support of the plant, particularly where the plant has been newly introduced into the planting container 30. Thus, as particularly illustrated in FIG. 3, a support or stake 58 is carried by an integral collar and stem device 60,62 which is supported in spaced relation from the wall of the container 30 by a socket component 64 integral with the wall of the container. In use, the stake 58 is inserted within the collar 60 and the stem 62 is thereafter frictionally interlocked within the socket 64. Additional improvements and variations will, of course, suggest themselves to those skilled in this art.

From the foregoing, it will be apparent that the combination planting device of the invention can be employed in a wide variety of applications, simply, and with a minimum of effort. More important, the combination planting device facilitates use of one or several planting containers within a removable grid of the planting device, with such elements being interchangeable, to enable interchanging of plant units or rotation of the same for lighting or plant health, or to meet the various other requirements. In all such uses of the combination planting device, individual plants will have necessary access to air through the peripheral passage about the grid 24, and to water and nutritive elements through the wicking action of the liners 36 and their depending components 37. The combination planting device also enables the liquid level of the reservoir 44 to be easily determined by means of the described flotation gauge so that additional water and nutritive elements may be added from time to time as may be needed or desired. In general, the combination planting device of the invention facilitates placement of a desired variety of plants and decorative elements in desired arrangement, wherein the plants can be self-sufficient for relatively prolonged periods of time due to the optimum environment provided by the system.

I claim:

1. A decorative, self-watering planting device comprising in combination an outer water impervious container, said outer container having a bottom, side walls and an open top, an upstanding support frame removably positioned within said outer container, said support frame being generally open in construction and spaced inwardly from the sides of said outer container, a substantially planar removable grid supported on an upper surface of said frame in inwardly spaced relation from the side wall of said outer container, said grid being provided with a plurality of apertures of desired configuration and placement, a plurality of inner plant containers removably positioned and supported within the apertures of said grid, said plant containers being provided with support means at an upper peripheral portion whereby the plant containers extend downward within said open frame and said other container, each of said inner plant containers being provided with a removable apertured bottom member, said bottom member providing means to support an inner liner constructed at least in part of fibrous elements capable of transmitting liquid by capillary action, the liner for each of said inner plant containers having a portion extending downward through the apertured bottom member into a lower region of said outer container, the removable bottom member and liner of each of said inner plant containers serving to support a plant and its planting soil within the same, and means to introduce water and nutrient liquids to the lower region of said outer container whereby the same can be transmitted by capillary action through the downward extending portions of said liners which function as wick means for each individual plant container, said combination planting device thereby serving as a self-contained, self-watering combination adapted to continuing life support of a plurality of individual plants contained within said inner plant containers.

2. A combination planting device as in claim 1 wherein said liners enclose the removable bottom member of said inner plant containers, said removable bottom members forming a support for the downward extending wick portions of said liners.

3. In a combination self-watering planting device, an outer liquid retaining container, an open upstanding support frame received within said outer container, an apertured grid removably supported on an upper surface of said frame, at least one inner plant container removably supported within an aperture within said grid so as to extend downward within said open frame and outer container, said inner container serving to support a plant and its planting soil within an upper region of said outer container, wick means lining bottom and side wall portions of said inner container and having a portion extending downward into an open space within said outer container and beneath said inner container, said apertured grid being of smaller diameter than said outer container so as to be inwardly spaced therefrom to provide a peripheral air passage between said grid and said outer container and to enable nutrient liquid to be introduced therebetween to said open space in the bottom of said outer container, whereby said inner container can be removably positioned within said support grid in such fashion that said wick means can continuously deliver nutrient liquid by capillary action to soil within said inner container.

4. A combination planting device as in claim 3 wherein said outer container and said support frame are of generally cylindrical configuration and said apertured grid is of substantially planar configuration to be removably supported on said frame.

5. A combination planting device as in claim 4 wherein said apertured grid is provided with a plurality of openings of configuration to receive correspondingly sized plant containers.

6. A combination planting device as claim 3 wherein said inner plant container is provided with a removable bottom member which provides a means of support for said wick means, said removable bottom member having a central opening for said downward extending portion of said wick means.

7. A combination planting device as in claim 6 whereby said wick means completely surrounds said removable bottom member so as to be supported thereby.

8. A combination planting device as in claim 3 wherein said inner plant container is provided with removable means to vertically position a plant support.

9. A combination planting device as in claim 3 wherein said outer container is provided with upright guide means on an inner surface thereof, and a retained floating device to indicate the level of nutrient liquid within the bottom region of said outer container.

10. A combination planting device as in claim 3 wherein said apertured grid is formed as a substantially planar frame provided with a plurality of open interconnected support members designed to support a plurality of inner plant containers.

11. A combination planting device as in claim 10 wherein said liners conform to the inner configuration of said inner plant members so as to fully line the interior surfaces thereof.

* * * * *